United States Patent [19]

Strait

[11] Patent Number: 4,824,296
[45] Date of Patent: Apr. 25, 1989

[54] BEARING ARRANGEMENT FOR A ROTATABLE TURNING BAR

[75] Inventor: David S. Strait, Newberg, Oreg.

[73] Assignee: Climax Portable Machine Tools, Inc., Newberg, Oreg.

[21] Appl. No.: 108,542

[22] Filed: Oct. 14, 1987

[51] Int. Cl.$^4$ ............................................. B23B 41/00
[52] U.S. Cl. .......................................... 408/80; 408/83
[58] Field of Search ....................... 408/80, 81, 82, 83, 408/83.5

[56] References Cited

U.S. PATENT DOCUMENTS

| | | | |
|---|---|---|---|
| 1,721,310 | 7/1929 | Miller | 408/83.5 |
| 1,859,836 | 5/1932 | Moen | 408/83.5 |
| 1,905,819 | 6/1933 | Doyle | 408/83.5 |
| 3,331,286 | 7/1967 | Brooks | 408/80 |
| 4,007,501 | 2/1977 | Okano et al. | 51/241 VS |
| 4,050,836 | 9/1977 | Anders | 408/80 X |
| 4,106,880 | 8/1978 | Anders | 408/1 R |
| 4,571,129 | 2/1986 | Strand | 408/54 |
| 4,678,379 | 7/1987 | Sunday | 408/83.5 |

*Primary Examiner*—Eugene F. Desmond
*Attorney, Agent, or Firm*—Dellett, Smith-Hill & Bedell

[57] ABSTRACT

A surfacing machine mountable within a bore of a workpiece includes a turning bar supported by a bearing arrangement which permits rotational and axial movement of the turning bar relative to support chucks mounted on a workpiece. The arrangement facilitates both visual and physical access to the work site such that an operator may switch surfacing operations without changing the mounting alignment of the surfacing machine within the bore.

12 Claims, 2 Drawing Sheets

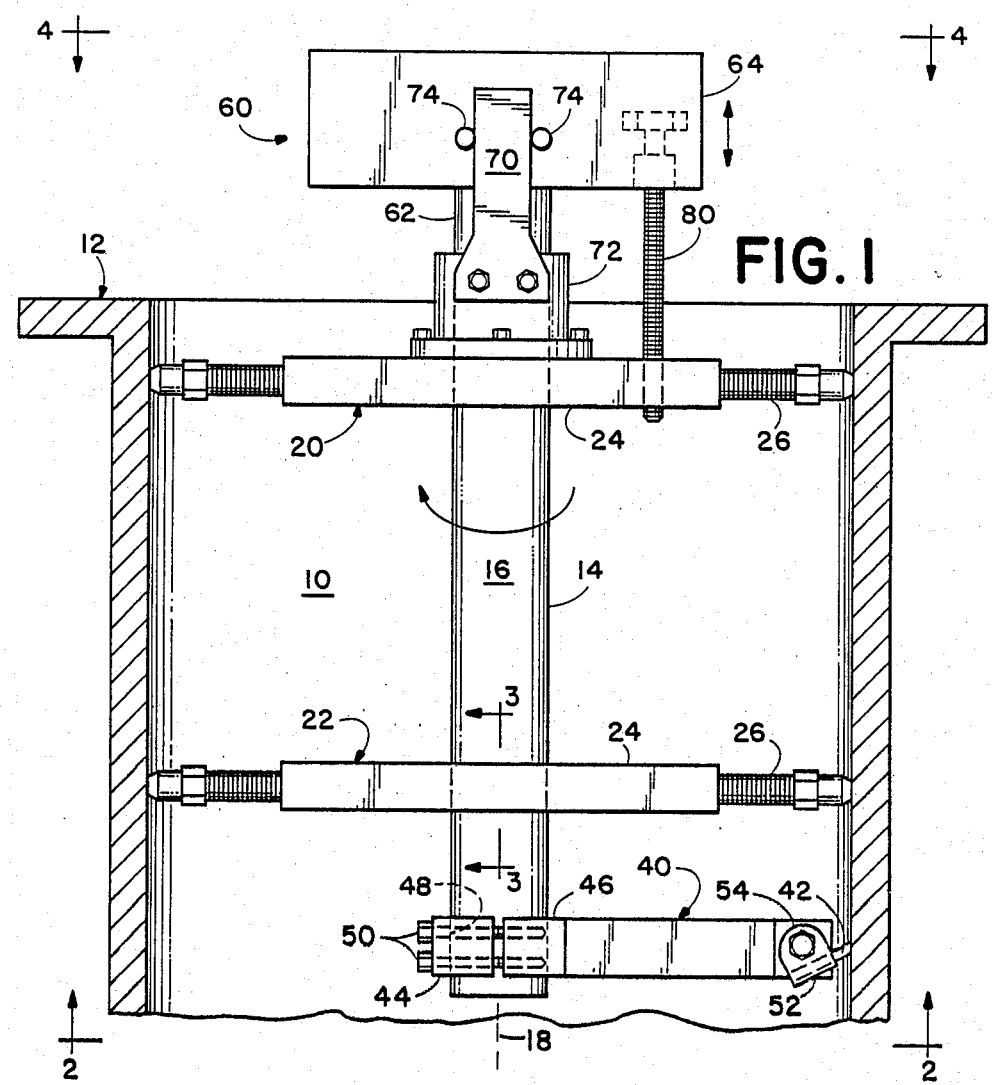
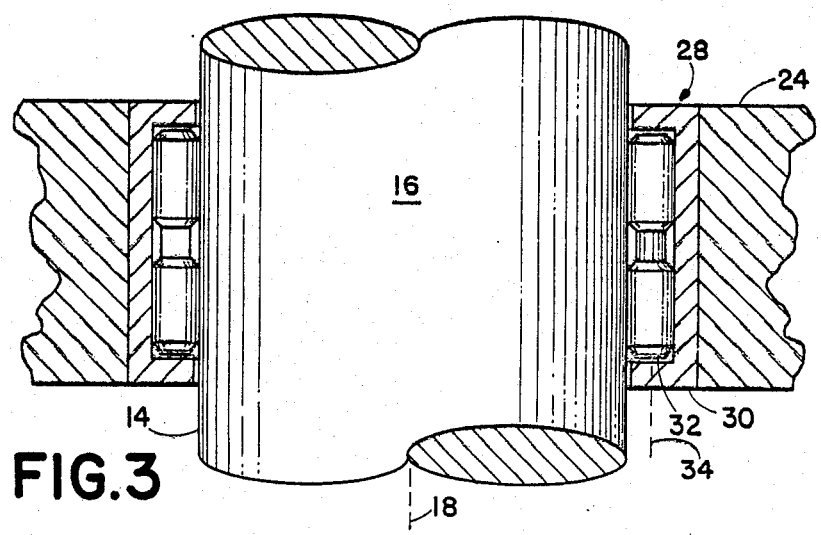

BEARING ARRANGEMENT FOR A ROTATABLE TURNING BAR

BACKGROUND OF THE INVENTION

This invention relates to a bearing arrangement for a rotatable turning bar.

Surfacing machines which are mounted within a workpiece, such as a large valve or the like, typically cannot accurately repeat a given mount. This is critical when the operator must mount and dismount the machine to change surfacing tools in the course of a surfacing operation. Initially, the machine is mounted and aligned relative to a portion of the workpiece to be surfaced and a cutting operation is performed. The machine is then dismounted in order to attach a grinding tool and remounted, as close to the initial mount as possible, to perform a grinding operation. Misalignment relative to the initial mounting requires that the grinding operation first work the surface to conform to the new mounting alignment. The net result is that an excessive amount of material is removed due to an inability to replicate the initial mount. Many prior art devices require special mounting surfaces integral to the work site, i.e. the workpiece, and are often limited to special surfacing operations, such as valve seat resurfacing.

SUMMARY OF THE INVENTION

A surfacing machine utilizing a central turning bar having a tool support arm mountable along the length of the bar and a drive mechanism disposed at an upper end of the bar provides improved visual and physical access to a work site, such as the interior of a valve body, when the surfacing machine is mounted thereat. Support chucks are mountable to the workpiece and include bearing elements which ride directly on the exterior surface of the turning bar and allow for rotational and axial movement of the turning bar. Since it is not necessary to accommodate a bearing race between the bearing elements and the turning bar, a turning bar of greater diameter can be used, and this improves the rigidity and accuracy of the surfacing machine. The drive mechanism is mounted upon the turning bar and includes a rotational drive motor coupled to the turning bar. The drive mechanism is held against all but axial movement relative to the support chucks such that operation of the motor causes the turning bar to rotate relative to the chucks. Axial positioning of the tool support arm is permitted by movement of the drive mechanism relative to the support chucks.

BRIEF DESCRIPTION OF THE DRAWINGS

For a better understanding of the invention, and to show how the same may be carried into effect, reference will now be made, by way of example, to the accompanying drawings in which:

FIG. 1 is a side view of a surfacing machine embodying the present invention;

FIG. 3 is a sectional view of a portion of the machine of FIG. 1 depicting a bearing arrangement for rotationally supporting a turning bar while allowing axial movement thereof.

DETAILED DESCRIPTION

Figure 4:
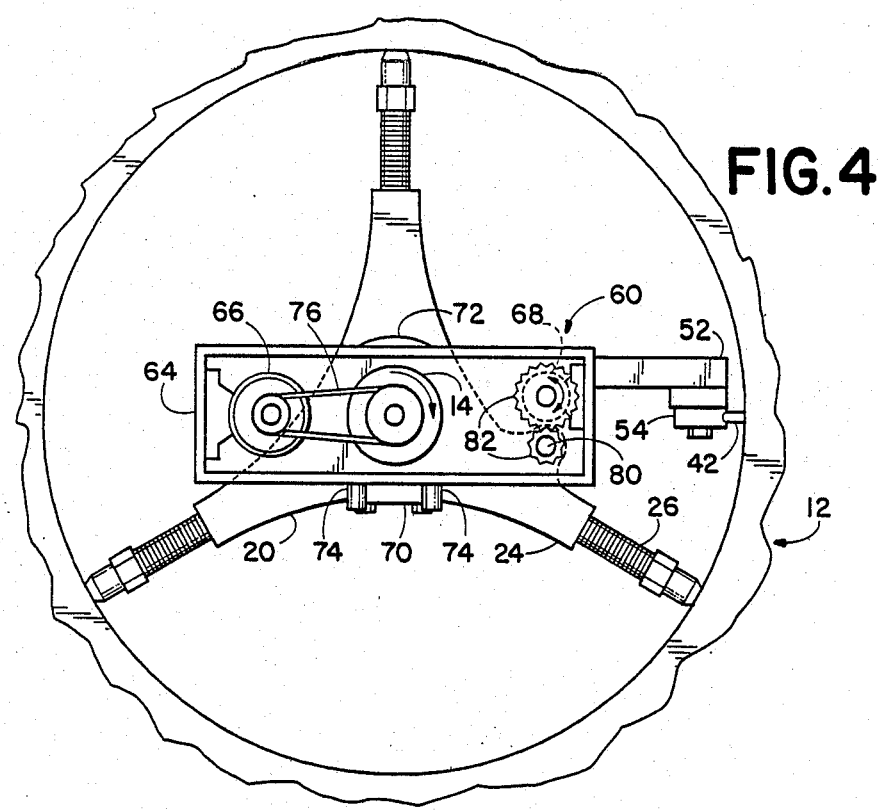
FIG. 4 is a top view of the machine of FIG. 1 showing portions of the rotational drive and axial positioning mechanisms.

FIG. 1 shows a surfacing machine in accordance with the present invention mounted within a cylindrical bore 10 defined by a workpiece 12 for surfacing portions of the workpiece 12. A keyless turning bar 14, having a hardened external surface 16 of circular cross-section defining a central axis 18, is rotatably and concentrically supported within the bore 10 by an upper support chuck 20 and a lower support chuck 22, each support chuck having a chuck body 24 and radially extensible legs 26 for engagement with the workpiece 12. The legs 26 are threaded within the corresponding chuck body 24 and the support chucks 20 and 22 are mounted within the bore 10 by rotation of the legs 26 to bring each of the legs 26 against the workpiece 12 while concentrically positioning the central axis 18 of the turning bar 14 within the bore 10.

Each of the support chucks 20 and 22 includes a bearing arrangement 28 (FIG. 3) which rotatably supports the turning bar 14 while allowing axial movement of the turning bar 14. More particularly, each bearing arrangement 28 comprises an outer bearing race 30 affixed to the corresponding chuck body 24 and needle roller bearings 32 captive between the outer bearing race 30 and the external surface 16 of the turning bar 14. To provide the turning bar 14 with maximum alignment stability within the support chucks 20 and 22, the needle bearings 32 are in a preloaded condition between the race 30 and the turning bar 14. The needle bearings 32 are each rotatable about an axis of rotation 34 parallel to the central axis 18. The turning bar 14 is thus permitted to both rotate about and translate along its central axis 18, relative to the support chucks 20, 22. In this manner, the external surface 16 of the turning bar 14 forms an inner race for the bearings 32 and permits the support chucks 20 and 22 to be conveniently positionable along the length of the turning bar 14.

Figure 2:
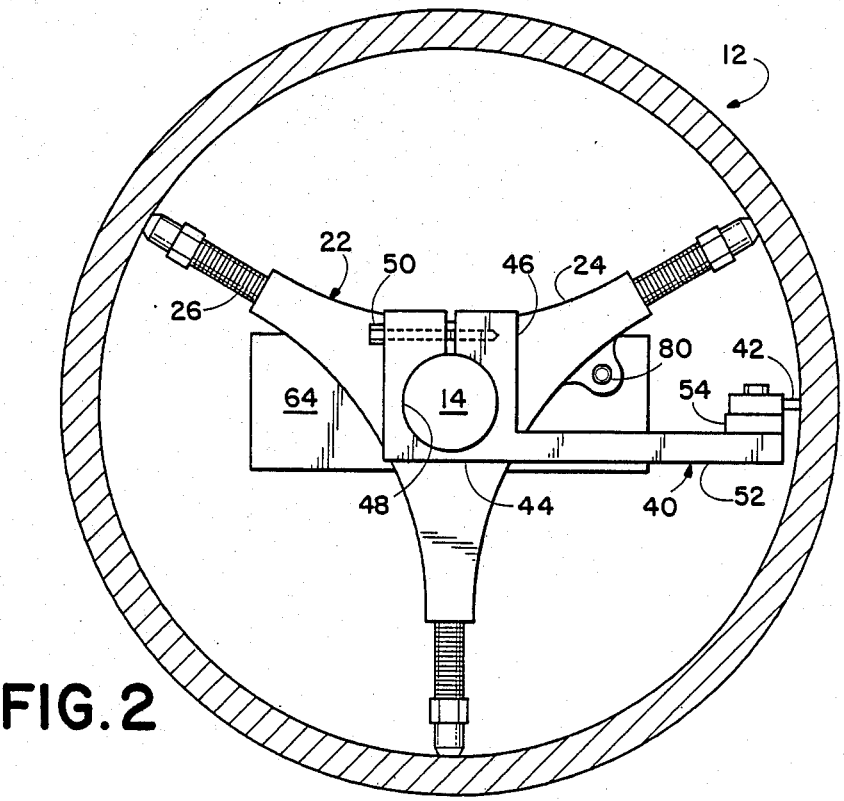
FIG. 2 is a bottom view of the machine of FIG. 1 better illustrating a tool support arm thereof.

A tool support arm 40 (FIGS. 1 and 2) is mounted on the turning bar 14 for carrying a surfacing tool 42 radially spaced from the central axis 18 such that rotation of the turning bar 14 causes the tool 42 to rotate about the central axis 18. At a proximal end 44 of the support arm 40, a mounting block 46 having an aperture 48 adjustable in diameter receives the turning bar 14 while bolts 50 close the aperture 48 upon the turning bar 14 to tightly secure the tool support arm 40 on the turning bar 14. At a distal end 52 of the support arm 40, a removable tool head 54 carries the surfacing tool 42 for engagement with the workpiece. The arm 40 is adapted to receive various tool heads for different surfacing operations, such as grinding or the like. For tool heads requiring a source of power, such as electrically or pneumatically transmitted power, the turning bar 14 may be tubular, and wires and hoses may be disposed within the turning bar 14 for coupling a tool head to a source of power. Thus, the support arm 40 is mountable along the length of the turning bar 14. As shown, the arm 40 is positioned below the chucks 20 and 22; however, it is understood that the bearing arrangement 28 and the keyless turning bar 14 make many configurations possible such as placing the arm 40 above or between the chucks 20 and 22, as required by the contour of a given workpiece of the nature of a given surfacing operation. Further, removal of the arm 40 would allow removal of the bar 14 without dismounting the chucks 20 and 22 such that a given mounting alignment may be preserved if it were necessary to reconfigure the machine during a surfacing operation.

A drive mechanism 60 (FIGS. 1 and 4) is positioned at an upper end 62 of the turning bar 14 and used to impart rotational and axial movement to the turning bar 14. The drive mechanism includes a housing 64 which is rotatably mounted on the turning bar 14 and carries a rotational drive motor 66 and an axial drive motor 68. The housing 64 is held against rotation about the central axis 18 relative to the support chucks 20 and 22 by a guide member 70 secured to the upper support chuck 20 by a tubular support 72 affixed to the chuck 20 and coaxial to the surface 16. The guide member 70 is held between pegs 74 affixed to the housing 64, the pegs 74 permitting axial movement of the guide member 70 therebetween. The rotational drive motor 66 is coupled to the turning bar 14 by a drive chain 76 such that operation of the rotational drive motor 66 serves to rotate the turning bar 14 relative to the support chucks 20 and 22. An axial lead screw 80 is rotatably secured to the housing 64 by a thrust bearing (not shown) and threadably engaged with the body 24 of the upper support chuck 20. The axial drive motor 68 is coupled to the axial lead screw 80 by gears 82 such that operation of the axial drive motor 68 in a first direction brings the housing 64 toward the upper support chuck 20 while operation in a second direction moves the housing 64 away from the upper support chuck 20 to effect up and down motion of the tool 42 relative to the workpiece 12.

By providing the turning bar 14 with rotational and axial movement relative to the support chucks 20 and 22 and by placing the drive mechanism 60 at the upper end 62 of the turning bar 14, it is possible for an operator to see clearly the work site and, more importantly, provides the operator with access to the work site to allow exchange of the tool head 52 for switching, for example, from a cutting operation to a grinding operation. There is no need to dismount the surfacing machine to exchange tool heads, and as a result less material is removed from the workpiece 12 and less time is required to surface the workpiece 12. Further, by eliminating the inner race for the bearing arrangement 28, a turning bar of larger diameter may be used which contributes greatly to the rigidity of the surfacing machine and the accuracy of its operation. Finally, because the support chucks 20 and 22 and the tool support arm 40 are positionable along the length of the turning bar 14, the surfacing machine is adaptable to many types of workpieces without a need for special mounting surfaces.

It will be appreciated that the present invention is not restricted to the particular embodiment that has been described and illustrated, and that variations may be made therein without departing from the scope of the invention as defined in the appended claims and equivalents thereof.

I claim:

1. A machine for surfacing a workpiece, the machine comprising:
    a turning bar having an external surface of circular cross section defining a central axis of said turning bar;
    support means mountable upon the workpiece;
    an outer bearing race affixed to said support means; and
    roller bearing elements each having an axis of rotation substantially parallel to said central axis, each being captive between said outer bearing race and the external surface of said turning bar and each held against movement relative to the support means in directions parallel to the central axis.

2. A machine according to claim 1 wherein said roller bearing elements are preloaded.

3. The machine according to claim 1, wherein the workpiece includes a bore and said support means bears against said bore for centrally disposing said turning bar within said bore.

4. The machine according to claim 1, wherein the external surface of said turning bar is hardened.

5. The machine according to claim 1, wherein said turning bar is substantially uniform in external cross section over substantially its entire length.

6. The machine according to claim 1, wherein the machine further comprises:
    drive means rotatably mounted on said turning bar and held against rotational movement relative to the support means; and
    axial positioning means for axial movement of the turning bar along the central axis.

7. A machine for surfacing a workpiece, the machine comprising:
    a turning bar having an external surface of circular cross section defining a central axis of said turning bar;
    a tool support arm affixed to said turning bar for carrying a tool radially spaced from the central axis;
    support means mountable upon the workpiece for rotatably supporting said turning bar while allowing axial movement of said turning bar;
    an outer bearing race affixed to said support means; and
    roller bearing elements each having an axis of rotation substantially parallel to said central axis and each being captive between said outer bearing race and the external surface of said turning bar.

8. A machine according to claim 7, wherein the machine further comprises:
    drive means rotatably mounted on said turning bar and held against rotational movement relative to the support means; and
    axial positioning means for axial movement of the turning bar along the central axis.

9. A machine according to claim 7 wherein said roller bearing elements are preloaded.

10. The machine according to claim 7, wherein the external surface of said turning bar is hardened.

11. The machine according to claim 7, wherein said turning bar is substantially uniform in external cross section over substantially its entire length.

12. The machine according to claim 7, wherein the workpiece includes a bore and said support means bears against said bore for centrally disposing said turning bar within said bore.

* * * * *